(12) United States Patent
Raste et al.

(10) Patent No.: US 12,114,605 B2
(45) Date of Patent: Oct. 15, 2024

(54) APPARATUS AND METHOD FOR CONTROLLING MATERIAL TRANSFER FROM A HARVESTING MACHINE

(71) Applicant: DEERE & COMPANY, Moline, IL (US)

(72) Inventors: Hrishikesh Raste, Sinhagad Road (IN); Zachary T. Bonefas, Grimes, IA (US)

(73) Assignee: Deere & Company, Moline, IL (US)

( * ) Notice: Subject to any disclaimer, the term of this patent is extended or adjusted under 35 U.S.C. 154(b) by 553 days.

(21) Appl. No.: 17/444,355

(22) Filed: Aug. 3, 2021

(65) Prior Publication Data

US 2022/0039318 A1 Feb. 10, 2022

(30) Foreign Application Priority Data

Aug. 4, 2020 (IN) .............................. 202021033371

(51) Int. Cl.
*A01D 43/073* (2006.01)
*A01B 69/04* (2006.01)
*A01B 79/00* (2006.01)

(52) U.S. Cl.
CPC .......... *A01D 43/073* (2013.01); *A01B 69/008* (2013.01); *A01B 79/005* (2013.01)

(58) Field of Classification Search
CPC .. A01D 43/073; A01D 43/087; A01D 41/127; A01B 69/008; A01B 79/005
See application file for complete search history.

(56) References Cited

U.S. PATENT DOCUMENTS

| | | |
|---|---|---|
| 5,575,316 A | 11/1996 | Pollklas |
| 6,345,231 B2 | 2/2002 | Quincke |
| 6,587,772 B2 | 7/2003 | Behnke |
| 6,943,824 B2 | 9/2005 | Alexia et al. |
| 7,537,519 B2 | 5/2009 | Huster et al. |
| 8,428,829 B2 | 4/2013 | Brunnert et al. |
| 9,014,901 B2 | 4/2015 | Wang et al. |
| 9,301,447 B2 | 4/2016 | Kormann |
| 9,992,932 B2 | 6/2018 | Bonefas et al. |
| 2009/0044505 A1* | 2/2009 | Huster ................ A01D 43/087 56/10.2 R |
| 2009/0306835 A1 | 12/2009 | Ellermann et al. |

(Continued)

FOREIGN PATENT DOCUMENTS

| | | |
|---|---|---|
| DE | 10119279 A1 | 10/2002 |
| DE | 102012211001 A1 | 1/2014 |

(Continued)

OTHER PUBLICATIONS

Extended European Search Report and Written Opinion issued in European Patent Application No. 21184607.6, dated Dec. 17, 2021, in 05 pages.

*Primary Examiner* — Daniel M. Robert
(74) *Attorney, Agent, or Firm* — Kelly, Holt & Christenson; Joseph R. Kelly

(57) ABSTRACT

An apparatus and method for controlling material transfer from a harvesting machine. More specifically, an apparatus and method for transfer of an agricultural crop from a harvesting machine having a crop discharging device to a transport vehicle comprising a crop loading container while the harvesting machine and the transport vehicle travel on a field.

20 Claims, 9 Drawing Sheets

(56) References Cited

U.S. PATENT DOCUMENTS

| | | | |
|---|---|---|---|
| 2011/0307149 A1* | 12/2011 | Pighi | A01D 43/087 |
| | | | 700/218 |
| 2012/0263560 A1 | 10/2012 | Diekhans et al. | |
| 2014/0290199 A1* | 10/2014 | Herman | H04N 13/279 |
| | | | 56/10.2 R |
| 2015/0149048 A1* | 5/2015 | Menke | A01D 43/087 |
| | | | 701/50 |
| 2016/0249533 A1* | 9/2016 | Byttebier | A01D 90/12 |
| | | | 701/50 |
| 2018/0325031 A1* | 11/2018 | Rotole | A01D 43/102 |
| 2018/0332767 A1 | 11/2018 | Muench et al. | |
| 2019/0104674 A1* | 4/2019 | Sawaki | A01B 79/005 |
| 2020/0214205 A1* | 7/2020 | De Smedt | A01D 43/086 |
| 2021/0087777 A1* | 3/2021 | Kenkel | E02F 9/2041 |
| 2022/0039318 A1* | 2/2022 | Raste | A01B 79/005 |

FOREIGN PATENT DOCUMENTS

| | | | |
|---|---|---|---|
| EP | 2020174 | A1 | 2/2009 |
| EP | 2130423 | A2 | 12/2009 |
| EP | 2452551 | A2 | 5/2012 |
| WO | WO2012110544 | A1 | 8/2012 |

\* cited by examiner

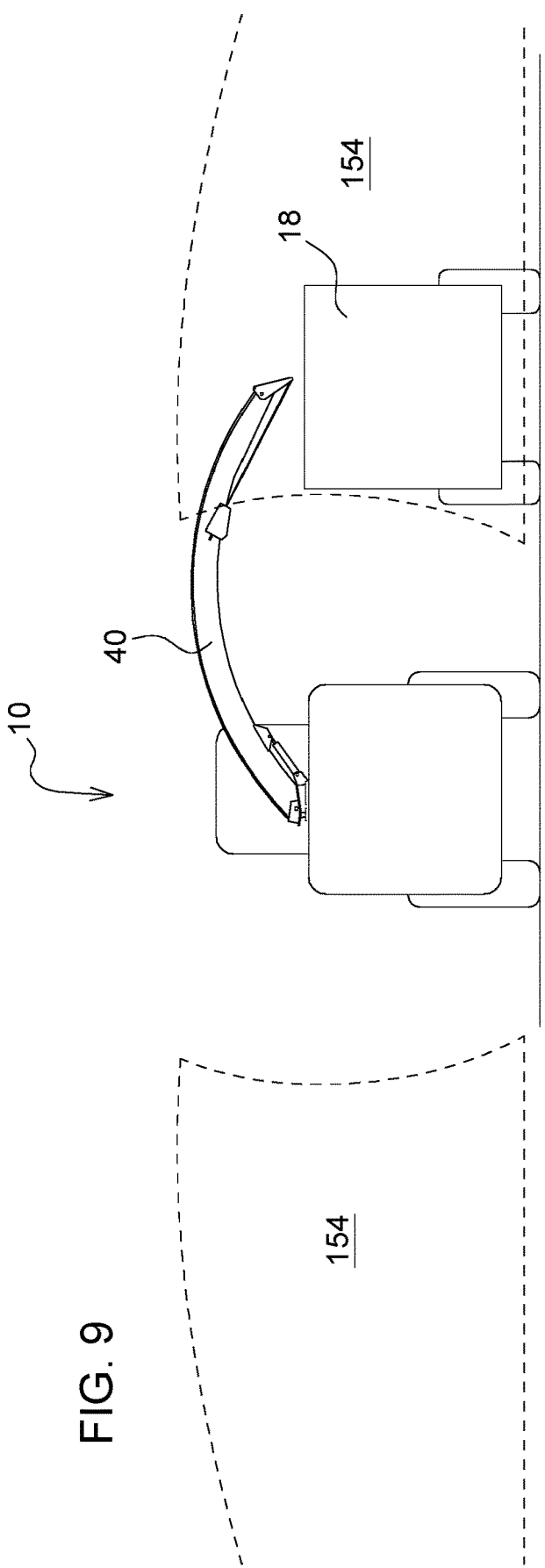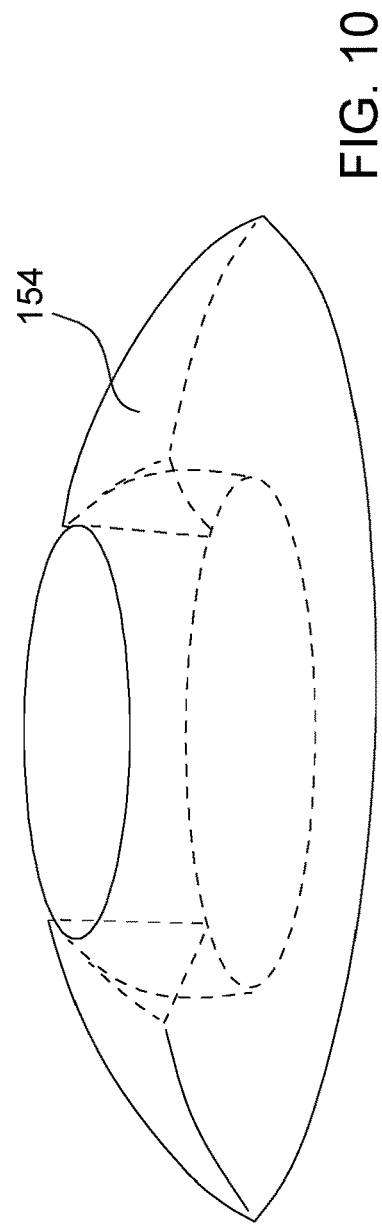

APPARATUS AND METHOD FOR CONTROLLING MATERIAL TRANSFER FROM A HARVESTING MACHINE

RELATED APPLICATIONS

This document claims priority based on Indian Patent Application No. 202021033371, filed on Aug. 4, 2020, which is hereby incorporated by reference into this application.

FIELD OF THE DESCRIPTION

The present disclosure concerns an apparatus and method for controlling material transfer from a harvesting machine. More specifically, transfer of an agricultural crop from a harvesting machine having a crop discharging device to a transport vehicle comprising a crop loading container while the harvesting machine and the transport vehicle travel on a field.

BACKGROUND

When harvesting agricultural crop on a field it is established practice that a harvesting machine loads a transport vehicle, which moves alongside the harvesting machine, with harvested crop, while the harvesting machine is harvesting (e.g., in case of a forage harvester) or continues harvesting (e.g., in case of a combine harvester). A loading container of the transport vehicle which is, for example, a tractor with a trailer or a truck, is loaded during its travel over the field with the harvested crop with a discharging device of the harvesting machine, for example in a forage harvester via a spout and in a combine harvester via a discharge tube. The discharging device is generally fastened rotatably to the harvesting machine about a vertical axis and is pivotable between a resting position in which it is oriented approximately parallel to the longitudinal axis of the harvesting machine and an operating position in which it extends transversely to the direction of travel of the harvesting machine. Additionally, at some types of harvesting machines, the height of the end of the discharging device on the discharge side may be varied, as may be the position of an ejection flap which defines the angle at which the harvested crop is discharged.

In discharging devices which may not be adjusted in their discharge position, as used conventionally in combine harvesters, the operator of the transport vehicle must ensure that the loading container is filled uniformly and fully by gradually positioning different points of the loading container below the discharging device. This task is relatively demanding and tiring as losses of harvested crop due to harvested crop falling onto the field need to be avoided.

With adjustable discharging devices, as used conventionally in forage harvesters, in the simplest case the position of the discharging device is manually controlled by the operator of the harvesting machine, for which purpose input devices are available to the operator in the cab, which activate actuators used for adjusting the discharging device. In this connection, the operator of the harvesting machine must ensure that the entire loading container of the transport vehicle is sufficiently filled, which is carried out by successively aligning the discharging device with different points on the loading container. Should the transport vehicle deviate from its desired position forward or backward or to the side, the position of the discharging device has to be manually readjusted. In this connection, it may be regarded as a drawback that the control of the position of the discharging device takes up a considerable portion of the attention of the operator which results in tiring work for the operator of the harvesting machine.

SUMMARY

An apparatus for controlling the transfer of agricultural crop from a harvesting machine to a transport vehicle, the apparatus comprising: an electronic control unit, the electronic control unit configured to provide a control signal to an actuator adapted to control at least one of a relative position of a distal end of the discharging device or a discharge direction of a crop discharging device on the harvesting machine with respect to a crop loading container of the transport vehicle and wherein the electronic control unit is adapted to provide the control signal based on a sensor signal from at least one sensor and stored data regarding a relationship between the sensor signal and the control signal, the at least one sensor configured to sense one or more physical values influencing an impingement location of the crop on the container; and an operator interface connected to the electronic control unit, the operator interface configured to provide an operator override input signal regarding a received operator input for overriding the control signal, such that the operator can modify the control signal if the impingement location observed by the operator deviates from a desired impingement location, characterized in that the control unit is configured to modify the stored data regarding the relationship between the sensor signal and the control signal based upon the operator override input signal.

A method for controlling the transfer of agricultural crop from a harvesting machine to a transport vehicle, the method comprising: generating, with an electronic control unit, a control signal to an actuator for controlling a relative position of a distal end of the discharging device with respect to a container on the transport vehicle; comparing, with the electronic control unit, a sensor signal from at least one sensor relating to one or more physical values influencing a calculated impingement location of the crop on the container and stored data regarding a relationship between the sensor signal and the control signal; inputting, with an operator interface, an operator override input signal regarding a received operator input for overriding the control signal, such that the operator can modify the control signal in case that an impingement location observed by the operator deviates from the calculated impingement location; and modifying, with the electronic control unit, the stored data regarding the relationship between the sensor signal and the control signal based upon the operator override input signal.

DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 9 shows a rear view of the harvesting machine and the volume that can be potentially filed with crop; and FIG. 10 shows the volume indicated in FIG. 9 in a 3-D representation.

DETAILED DESCRIPTION

Figure 1:
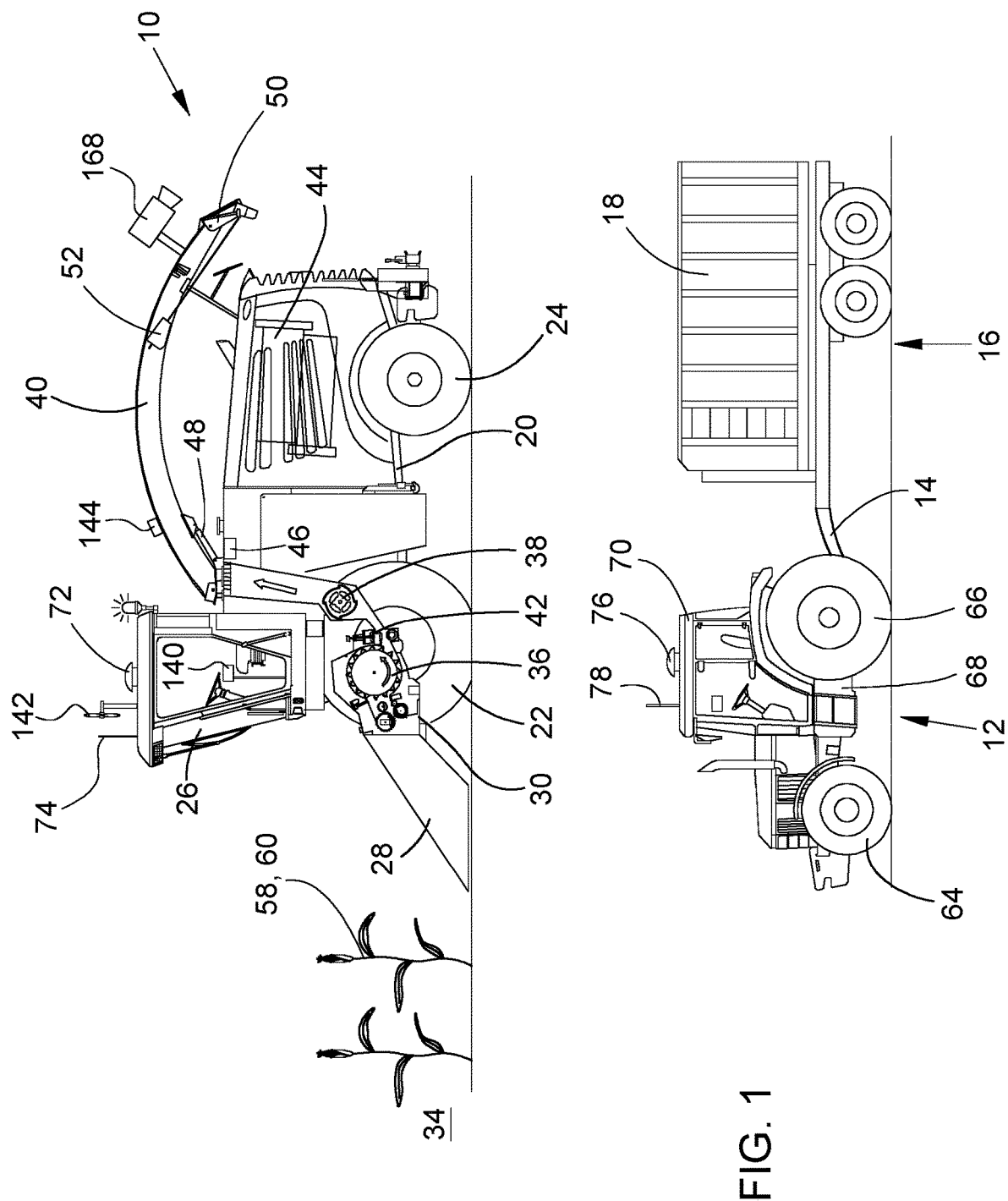
FIG. 1 shows a side view of a self-propelled harvesting machine and a transport vehicle.

A combination of two agricultural machines shown in FIG. 1 comprises a harvesting machine 10 embodied by a self-propelled forage harvester and a transport vehicle 12 embodied by a self-propelled tractor which, using a towbar 14, pulls a trailer 16 which comprises a loading container 18.

In one aspect, there is an effort to automate the transfer of agricultural crop from a harvesting machine to a loading container of a transport vehicle. This automation involves in a first development level control of the relative position of the distal end of the discharging device with respect to the container and/or discharge direction of the discharging device with respect to the container, in order to avoid losses due to crop spilling onto the field, and in a second development level automatic control of the filling level of crop on the container such that the crop height over the length and width of the container corresponds to a desired shape. In both levels, the relative position and/or discharge direction are controlled such that the crop impinges at a desired point on the container. It is thus possible to control speed and drive direction of the transport vehicle and optionally of the harvesting machine. Additionally, or alternatively, in case of a position-adjustable discharge device, as provided on forage harvesters, the orientation of the discharge device around a vertical axis and around a horizontal axis as well as the position of a discharge flap can thus be controlled automatically to automatize crop transfer.

One approach to automating the crop transfer is to derive an expected location of the impingement point of the crop on the container. Thus, the relative position of the container and the harvesting machine can be sensed, for example using optic sensors (2-D or 3-D cameras or laser scanners, U.S. Pat. No. 9,992,932) or ultrasonic sensors (U.S. Pat. No. 5,575,316) or using beacons and sensing the time of flight (European Patent Appl. No. 2452551). Another possibility is to sense the absolute position of the container and the harvesting machine, using signals from a satellite-based positioning system (global navigation satellite system (GNSS), like GPS, Glonass or Galileo), as described for example in U.S. Pat. Nos. 6,857,772, 7,537,519, 8,428,829, 9,301,447 and WIPO Patent Appl. No. 2012/110544 A1. Based on the sensed relative position and a known crop discharge direction of the discharging device, the impingement location is calculated, and the relative position and/or discharge direction are controlled.

The first approach is an open loop control, since the impingement point is only calculated, but not sensed, although it was proposed to consider numerous external influences, like wind, actual and expected future speed, planned path, orientation and steering direction of both vehicles (e.g., U.S. Pat. No. 9,992,932), and can thus be subject to inaccuracies, due to possible disturbances not considered in the calculation of the location of the impingement point. For example, the unknown velocity of the discharged crop influences its path.

A second approach to automatize the crop transfer is to sense the location of the impingement point of the crop on the container. This can be done with cameras directly looking onto the impingement point and also detecting the position of the container (US Patent Appl. No. 2012/0263560).

The second approach is a closed loop control, in which the influence of possible disturbances is automatically incorporated, at least as long as the impingement point can be reliably detected, what would not be the case for example if the camera is obscured by crop particles. Further, the second approach requires a relatively expensive camera system.

In some examples, the operator can override an automatically determined position and/or discharge direction of the discharging device with respect to the container via a user interface. In this case, the automatic control process is suspended at least temporarily (e.g., U.S. Pat. No. 6,943,824). It was also proposed to let the operator align, a calculated impingement point of the crop on the container on a display with an image of the container, in order to teach the control system, the location of the container, in particular in situations when an image processing system has problems to identify the container on its end, for example during rear unloading (U.S. Pat. No. 9,992,932). Finally, it was proposed to let the operator of the transport vehicle input corrections to the transport vehicle speed and direction commanded by the harvesting machine, which are then adapted as new, corrected speed and steering commands in order to move the impingement point of the crop over the container in the forward and lateral direction (US Patent Appl. No. 2009/0306835). All these operator overrides to automatic control signals are just used temporarily for the actual situation and are not able to overcome possible problems of automatic control of crop transfer.

US Patent Appl. No. 2018/0332767 describes a combine harvester in which a control system receives crop height signals and operator override inputs, learns an operator-desired reel height based on the received crop height signals and adjusts the reel height based on the learned operator-desired reel height. Since different reel heights are possible and a matter of operator taste, this can hardly be applied to crop transfer since there is only a single correct position for the crop landing on the container.

As mentioned, automatic control of the automatically determined position and/or discharge direction of the discharging device relies on a number of sensors, like cameras and/or position determining devices, which can provide in certain unfavorable conditions signals with relatively low precision. This is particular the case for the first approach with the open control loop, not having a real feedback signal on the actual impingement location of the crop on the container as provided by the second approach, especially if a crop flight model for calculating an impact location of the crop on the container, using numerous external sensor values for crop moisture, mass flow, blower speed, crop type, wind speed and direction, machine roll, machine pitch, discharging device orientation and discharge direction is used. If one or more sensors provide an imprecise signal, the kinematic model is not able to provide suitable control signals and thus the entire system will not operate as desired. The operator thus needs to take over manual control again, dissatisfying the operator.

The harvesting machine 10 is built on a frame 20 which is carried by the front driven wheels 22 and steerable rear wheels 24. The harvesting machine 10 is operated from the operator's cab 26 from which a harvesting attachment 28 in the form of a corn cutting attachment is visible, which is mounted to an inlet channel 30 on the front face of the forage harvester 10. With the harvesting attachment 28, harvested crop picked up from a field 34 is conveyed via an inlet conveyor, arranged in the inlet channel 30 and comprising pre-compacting rollers of a chopping drum 36, which chops the crop into small pieces and supplies it to a blower 38. Between the chopping drum 36 and the blower 38 extends a fine crushing device 42 comprising two kernel processing rollers. The aforementioned drivable units of the harvesting machine 10 and of the harvesting attachment 28 are driven by an internal combustion engine 44. The crop discharged by the blower 38 leaves the harvesting machine 10 in the direction of the loading container 18 driven alongside via a discharging device 40 in the form of an ejector spout, which may be rotated by a first, external force-actuated actuator 46 about an approximately vertical axis and which may be adjusted in inclination by a second external force-actuated actuator 48, the direction of ejection being able to be altered by a flap 50, and the inclination thereof being able to be adjusted by a third external force-actuated actuator 52.

Figure 2:
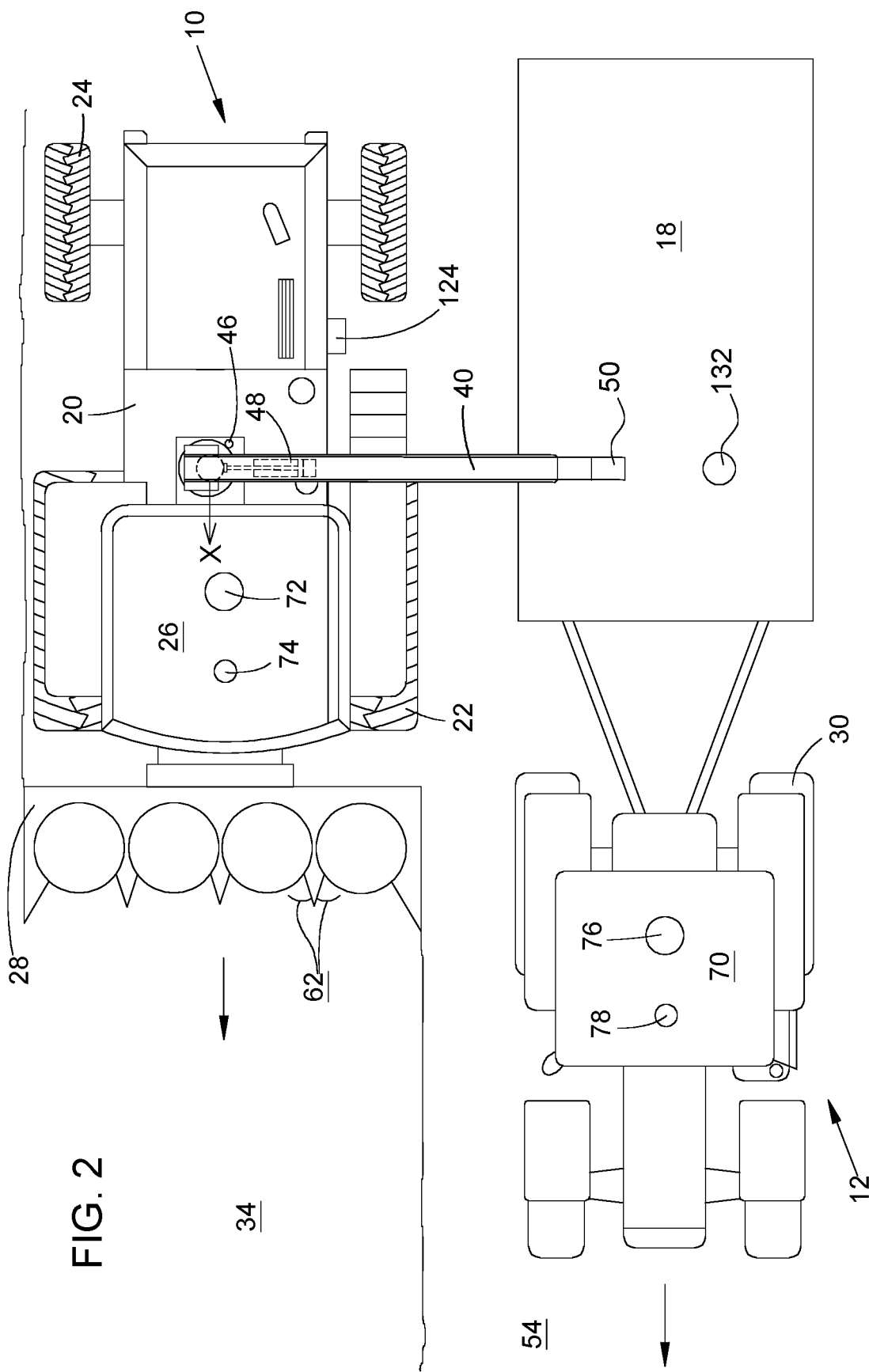
FIG. 2 shows a schematic plan view of the harvesting machine and the transport vehicle, which together carry out a harvesting and transferring process on a field.

The transport vehicle 12 and the trailer 16 are of conventional design. The transport vehicle 12 comprises front steerable wheels 64 and rear driven wheels 66, which are supported on a frame 68 which carries an operator's cab 70. In FIG. 2, the harvesting machine 10 and the transport vehicle 12 are shown in plan view. It may be seen that the harvesting machine 10 moves along the edge of the harvested crop 54, which represents a boundary between the harvested region 56 of the field 34 and the plant population 60 of the field 34 which is still upright and full of corn (maize) plants 58, and which harvests the plants 58. The transport vehicle 12 drives on the harvested part 56 of the field parallel to the harvesting machine 10 along a path on which the plants chopped by the harvesting machine 10 pass through the discharging device 40 into the loading container 18. The transport vehicle 12, therefore, always has to drive parallel alongside the harvesting machine 10; in particular when driving into (opening) the field, however, the transport vehicle 12 may also drive behind the harvesting machine 10 as no harvested part 56 of the field 34 is present on which the transport vehicle 12 could drive without damaging the plants located there.

The harvesting machine 10 is steered by an operator sitting in the operator's cab 18 or by an automatically operating steering device known per se. The transport vehicle 12 is also provided with a steering device described in more detail hereinafter, in order to simplify and/or automate travelling parallel with the harvesting machine 10. The harvesting machine 10 could also be any other self-propelled harvesting machine, such as a combine harvester or beet harvester or sugar cane harvester.

The harvesting machine 10 is provided with a first position determining device 72, which is located on the roof of the cab 26. Here a first radio antenna 74 is also positioned. The transport vehicle 12 is provided with a second position determining device 76, which is located on the roof of the cab 70. Here a second radio antenna 78 is also positioned.

Figure 3:
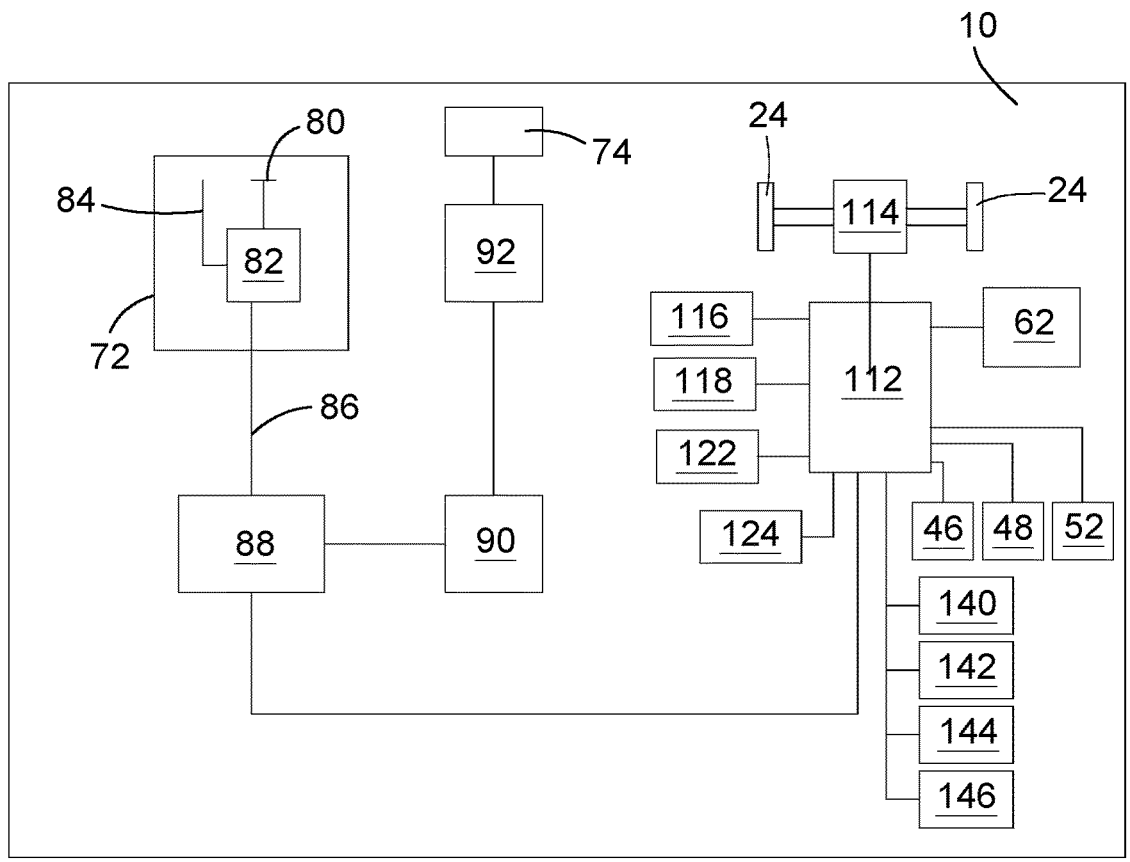
FIG. 3 shows a schematic view of the position determining devices of the two vehicles, as well as the elements cooperating therewith.
Figure 3:
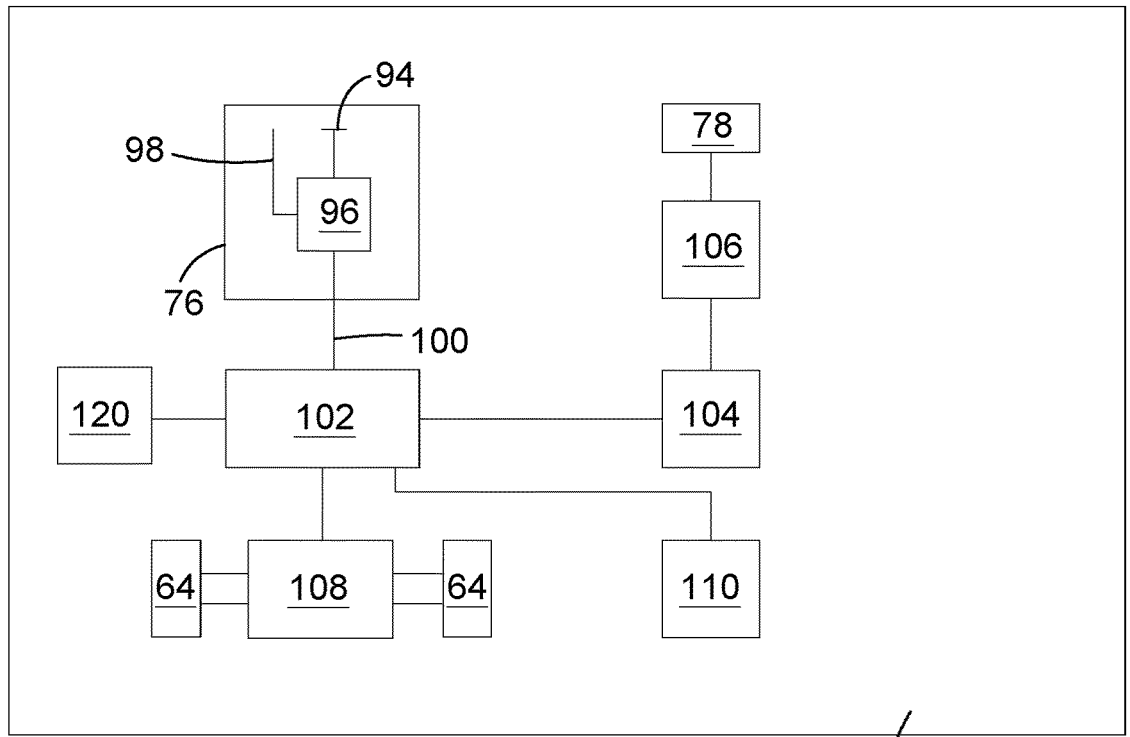

Reference is now made to FIG. 3, in which the individual components of the position determining devices 72, 76, and the steering devices of the transport vehicle 12 and of the harvesting machine 10 are shown schematically. The first position determining device 76 is located on-board the harvesting machine 10, said first position determining device comprising an antenna 80 and an evaluation circuit 82 connected to the antenna 80. The antenna 80 receives signals from satellites of a position determining system, such as GPS, Galileo or Glonass which are supplied to the evaluation circuit 82. Using the signals of the satellites, the evaluation circuit 82 determines the current position of the antenna 80. The evaluation circuit 82 is further connected to a correction signal receiving antenna 84, which receives radio waves emitted from reference stations at known locations. Using the signals modulated onto the radio waves, correction data for improving the accuracy of the position determining device 72 is produced by the evaluation circuit 82.

The evaluation circuit 82 transmits via a bus line 86 its positional data to a computing device 88. The computing device 88 is connected via an interface 90 to a receiving and transmitting device 92, which in turn is connected to the radio antenna 74. The receiving and transmitting device 92 receives and generates radio waves which are received and/or emitted by the antenna 74.

Similarly, the second position determining device 76 is located on-board the transport vehicle 12, said second position determining device comprising an antenna 94 and an evaluation circuit 96 connected to the antenna 94. The antenna 94 receives signals from satellites of the same position determining system as the antenna 80, which are supplied to the evaluation circuit 96. Using the signals of the satellites, the evaluation circuit 96 determines the current position of the antenna 94. The evaluation circuit 96 is further connected to a correction data receiving antenna 98, which receives radio waves emitted from reference stations at known locations. Using the radio waves, correction data is generated by the evaluation circuit 96 for improving the accuracy of the position determining device 76.

The evaluation circuit 96 transmits via a bus line 100 its positional data to a computing device 102. The computing device 102 is connected via an interface 104 to a receiving and transmitting device 106, which in turn is connected to the radio antenna 78. The receiving and transmitting device 106 receives and generates radio waves which are received and/or emitted by the antenna 78. Using the receiving and transmitting devices 90, 106 and the radio antennae 74, 78 data may be transmitted from the computing device 88 to the computing device 102 and vice versa. The connection between the radio antennae 74, 78 may be direct, for example provided in an authorized radio range such as citizen band radio, amongst other things, or via one or more relay stations, for example when the receiving and transmitting devices 90, 106 and the radio antennae 74, 78 operate according to the GSM standard or another appropriate standard for mobile telephones.

The computing device 102 is connected to a steering device 108, which controls the steering angle of the front steerable wheels 64. Moreover, the computing device 102 transmits speed signals to a speed setting device 110 which, by varying the engine speed of the transport vehicle 12 and/or the gear ratio, controls the speed of the transport vehicle 12. Moreover, the computing device 102 is connected to a permanent memory 120.

On-board the harvesting machine 10 the computing device 88 is connected to an electronic control unit 112, which together with the actuators controlled thereby and the sensors (including the position determining devices 72 and 76) connected therewith forms a control arrangement for controlling the transfer of the harvested crop from the harvesting machine 10 onto the loading container 18 of the transport vehicle 12. The latter is connected to a steering device 114, which controls the steering angle of the rear, steerable wheels 24. Moreover, the control unit 112 transmits speed signals to a speed setting device 116 which, by varying the gear ratio, controls the speed of the transport vehicle 12. The control unit 112 is further connected to a throughput sensor 118 which detects the distance between the pre-compacting rollers in the inlet channel, a sensor for detecting the position of plant row sensing members 62 attached to a divider point of the harvesting attachment 28, a permanent memory 122 and—via suited valves—to the actuators 46, 48 and 52.

First Aspect of Crop Transfer Control

Figure 5:
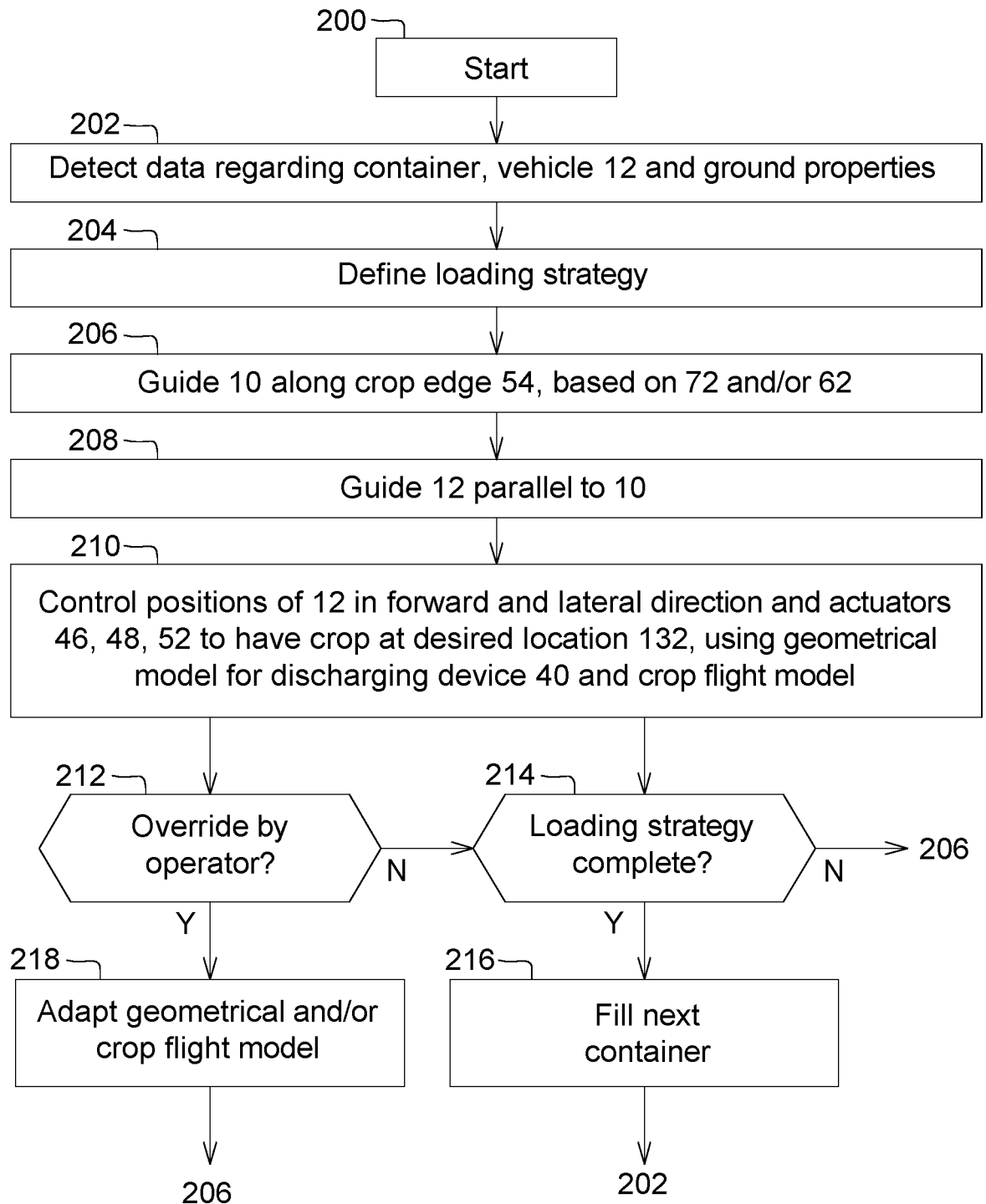
FIG. 5 shows a flow diagram of a first possible method according to which the control unit can operate.

A first embodiment on operation of control unit 112 is shown in FIG. 5. During a harvesting operation, after start (step 200) control unit 112 causes (step 202) the computing device 88 to request the contents of the memory 120 from the computing device 102. Data is contained therein, for example regarding the engine output of the transport vehicle 12, its type (in this case: tractive machine and/or tractor) and the tires (width, diameter, profile size). Moreover, using the input from an operator into an input device, the computing device 102 obtains data regarding the dimensions of the loading container 18 and the load bearing capacity of the trailer 16. This data could also be contained in the memory 120, or such data are stored in the memory 122 for different trailers 16 and may be selected by the operator of the harvesting machine 10 or by a barcode reader 124 which detects suitable markings on the trailer 16 or on the outer wall of the loading container 18. The barcode reader 124 could also be replaced by an RFID chip or transponder chip reader (not shown), which may read RFID chips or transponder chips attached to the trailer 16 or to the loading container 18. These chips contain the aforementioned data regarding the dimensions of the loading container 18 and the load bearing capacity of the trailer 16 or (similar to the barcode) only identification data, from which the aforementioned data may be read from the memory 122. Moreover, the control unit 112 also obtains data regarding the ground conditions. In this connection it is the lateral inclination and the inclination of the ground in the forward direction and data regarding the traction properties of the ground (for example whether it is loose sandy ground or relatively solid ground or damp ground). This data regarding the ground conditions is read from a card stored in the memory 122 using a path planned for the next harvesting process, stored in the memory 122.

Also, a loading strategy can be determined, according to which the loading container 128 is to be filled (step 204). The loading strategy defines the positions and the associated time periods in which the discharging device 40 will unload the harvested crop onto impingement locations 132 on the container 18. Thus, the horizontal and vertical dimensions of the loading container 18 and its load bearing capacity are taken into account, the density of the harvested crop being able to be derived from empirical values or being able to be measured by suitable sensors. Moreover, the type of transport vehicle 12 is taken into account. In the case shown here, the loading of the loading container 18 is initially carried out in its front region, in order to ensure a sufficient loading of the rear driven wheels 66 of the transport vehicle 12 via the towbar 14. A truck with a driven rear axle and loading container (not shown) arranged thereabove would, however, initially be filled in the rear region. The engine output of the transport vehicle 12, the data regarding the tires and the traction properties of the ground influence the intended filling level of the harvested crop in the loading container 18, in order to avoid the wheels 66 sinking into the ground or spinning in unfavorable conditions. The inclination of the ground also influences the loading strategy, in order to fill the side of the loading container 18 located uphill in each case to a higher level than the side located downhill. The loading strategy may provide that the loading container 18 is filled according to defined patterns, which are covered once or repeatedly. Examples of such patterns are strips extending in the forward direction along the middle of the loading container or zig-zag patterns extending from front to back. However, any other patterns are conceivable. In a possible embodiment of the present disclosure, two different basic loading strategies are stored, of which one starts with the loading of the loading container 18 at the front and the other at the back, and which are selected using the type of transport vehicle and/or the position of its driven wheels. The other aforementioned data thus serves to adapt the selected loading strategy to the respective operating conditions. In a very simple embodiment, the loading strategy may just be to let the crop land at a (fixed) location on the container 18, be it predetermined or input by the user interface 140 and thus subsequently alterable by the operator.

After the loading strategy has been determined and stored in the memory 122, the harvesting machine 10 is steered along the edge of the harvested crop 54 (step 206), by the control unit 112 providing steering signals to the steering device 114, which are based on the signals from the position determining device 72 and a card stored in the memory 122, which defines a path planned for the next harvesting process or based on signals from the sensing frames 62 or a combination of both signals. Alternatively, or additionally, the edge of the harvested crop 54 is detected by a two-dimensional or three-dimensional camera and an image processing system or a laser or ultrasound sensor or scanner and used for producing the steering signal for the steering device 114. The path of the harvesting machine 10 does not necessarily have to run dead straight but may also include curves depending on the shape of the field. Moreover, turning procedures at the end of the field are provided.

The speed of advance of the harvesting machine 10 may be predetermined by its operator, or the control unit 112 uses the throughput signals of the throughput sensor 118 in order to control the speed setting device 116 so that a desired throughput is achieved through the harvesting machine 10.

Moreover, the transport vehicle 12 is guided parallel to the harvesting machine 10 (step 208), by the control unit 112 transmitting to the computing device 102, via the computing device 88 and the radio antennae 74, 78, data regarding the position to be controlled by the transport vehicle 10. The computing device 102 then controls the steering device 108 and the speed setting device 110 accordingly, by comparing the position detected by the position determining device 76 with the desired, nominal position and, depending on the result of the comparison, emits suitable steering signals to the steering device 108. This comparison and the generation of the steering signal for the steering device 108 could also be carried out by the computing device 88 and/or the control unit 112 on-board the harvesting machine 10, the positional data being transmitted from the position determining device 76 of the transport vehicle via the radio antennae 74, 78 to the harvesting machine 10, whilst the steering signals are transmitted back in the reverse direction to the transport vehicle 12. The transport vehicle 12 follows the harvesting machine 10 even when driving around curves and when turning at the end of the field.

During crop harvesting and transferring, the actuators 46, 48 and 52 are activated for adjusting the position of the discharge end of the discharging device 40 and the direction of ejection according to the planned loading strategy, so that the loading container 18 is gradually filled in the planned manner, with crop landing on impingement locations 132 in the container determined according to the respective loading strategy (step 210). Additionally, or alternatively, the position of the transport vehicle 12 varies in the forward direction and/or in the lateral direction relative to the harvesting machine 10, by the control unit 112 transmitting to the computing device 102, via the computing device 88 and the radio antennae 74, 78, corresponding data regarding the position to be controlled by the transport vehicle 10. As a result, the path of the harvested crop between the discharge end of the discharging device 40 and the loading container 18 may be kept relatively short, which has the advantages that in windy conditions little harvested crop is lost and the harvested crop is pre-compressed on the loading container 18.

The positions of the actuators 46, 48 and 52 as automatically determined by the control unit 112 based on the desired impingement point 132 according to the loading strategy and a geometrical model for the discharging device 40 and a crop flight model for the trajectory of the crop from the discharging device 40 to the impingement point 132 on the container 132 (the geometrical and crop flight models per se described in U.S. Pat. No. 9,992,932, there calculated by a kinematic module 403 and material projection module 411, with the entire teaching thereof incorporated herein by reference) in step 210 can be overridden by the operator by a user interface 140 (step 212) having keys or other suitable input interfaces for controlling the positions of the actuators 46, 48, 52, as described per se in German Patent Appl. No. DE 101 19 279 A1 and U.S. Pat. No. 6,943,824. The harvesting machine 10 and/or the transport vehicle 12 can also be provided with user interfaces enabling the respective operator to override automatically determined speed and/or direction controls. If in step 212 the result is that there is no operator override, step 214 follows.

Once step 214 reveals that the loading strategy has been fulfilled, an information device (not shown) operated optically or acoustically by the control unit 112 via the computing devices 88, 102 in step 216, causes the operator of the transport vehicle 12 to take over control of the transport vehicle 12 and to clear space in the vicinity of the harvesting machine 10, in order to create space for another transport vehicle which follows. Alternatively, the steering unit 108 of the transport vehicle 12 is activated to move the transport vehicle forward to the side, whereupon the operator of the transport vehicle 12 takes control. The transport vehicle 12 which follows is positioned by its operator alongside the harvesting machine 10 and the mentioned process starts again. If this process has to be repeated for the same transport vehicle 12, the control unit 112 may also refer back to the already previously stored loading strategy.

It should be noted that in a simplified embodiment the operator of the harvesting machine 10 steers said machine and predetermines its speed, whilst the operator of the transport vehicle 12 steers said vehicle and predetermines its speed. The control unit 112 then only controls the actuators 46, 48 and 52 according to a loading strategy selected manually by the operator of the harvesting machine from at least two available loading strategies, and which preferably depends on the position of the driven wheels of the transport vehicle 12, as mentioned above. These loading strategies may be modified by the operator of the harvesting machine 10 manually according to the size of the loading container 18, for example by the discharging device 40 being initially positioned on the front and rear wall of the loading container 18.

Figure 4:
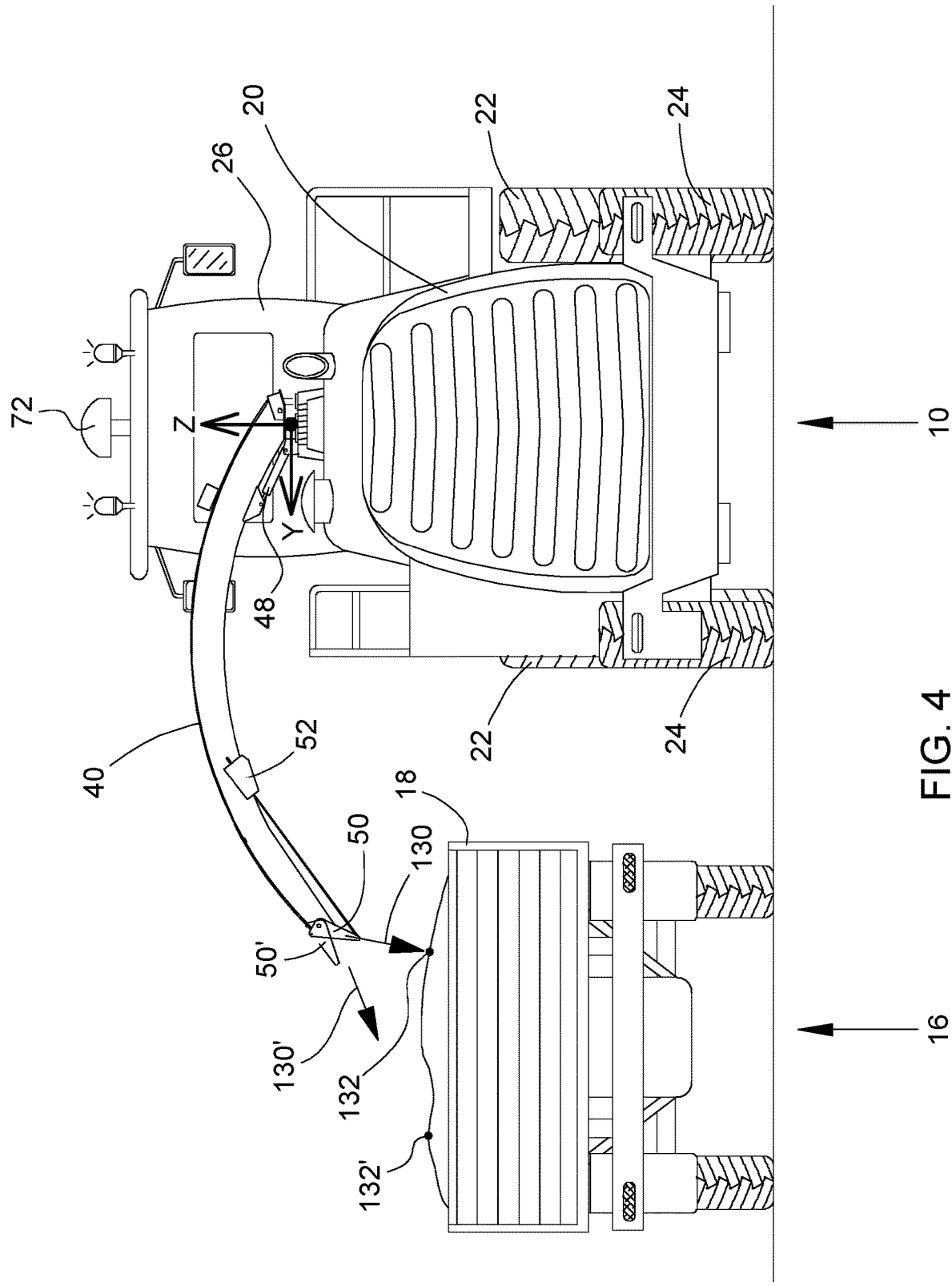
FIG. 4 shows a rear view of the two vehicles.

As described above, the automatic control of transferring the crop from the harvesting machine 10 to the container 18 of the transport vehicle 16 requires knowledge about the position of the impingement location 132 of the crop on the container 18, since it is essential that the actual impingement location 132 corresponds to a nominal impingement location determined by the loading strategy as described above. As can be seen in FIG. 4, the impingement location 132 is influenced by the position of flap 50: if the flap 50 is moved between a first position (flap 50) and second position (flap 50'), the crop impacts on the container at different impingement locations 132 or 132'. It is also to be seen in FIG. 4 that the crop, after leaving the discharging device 40, is in a free flight until it arrives on the container 18. The trajectory of the crop between discharging device 40 and container 18 is thus generally parabolic, due to physical laws. This means that the velocity of the crop at least in a certain manner influences the impingement location 132. Although this influence is small in the situation shown in FIGS. 2 and 4 with lateral unloading, it can be larger when the crop is unloaded to the rear, for example when opening a field.

Control of the actuators 46, 48 and 52 by control unit 112 based on an unloading strategy involves a calculation of the impingement location 132, which is done in the described embodiment based on the position signals of the position determination devices 72 and 76, using geometrical equations to determine the relative position of the discharge (distal) end of the discharge device 40 with respect to the container 18, and the mentioned trajectory of the crop between discharging device 40 and container 18. Based on the calculated impingement location 132 and a nominal impingement location as defined by the loading strategy, the actuators 46, 48 and 52 (and alternatively or additionally, the relative position of both vehicles 10, 12) are controlled in a sense of minimizing the difference between the calculated impingement location 132 and the nominal impingement location, using the geometrical model for calculating the exit location and direction of the crop at the distal end of the discharging device and the crop flight model for the trajectory of the crop between the distal end and the impingement point. If there is an operator override input in step 212, step 218 follows, in which the geometrical model and/or the crop flight model are automatically updated by control unit 112. Thus, if for example the operator controls the interface 140 to move one or more actuators 46, 48, 52 to move the discharging device 40 to move the impingement location 132 to the left, the control unit 112 can assume that an input parameter of the geometrical model and/or the crop flight model, be it from a sensor (like the wind sensor 140) or a pre-stored or operator input value on geometrical or other parameters of the transport vehicle 12 or harvesting machine 10, is not correct and according to the received operator input corrects the input parameter by storing a new relation between the input parameter and corresponding actuator control signals in memory 122 to overcome this problem.

Hence, in the case of an erroneous or imprecise sensor signal, an operator correction to the control signal is used to correct the relationship between the sensor signal and the corresponding control signal to the actuator moving the distal end of the discharging device (i.e., adjusting the position of the discharging device around the vertical axis and/or a horizontal axis) and/or adjusting the discharge direction thereof. The electronic control unit thus learns from the operator inputs possible sensor problems and corrects them on its end. Such operator interference leads to "learning" of the model which then appropriately modifies the aforementioned relation between the sensor signal and control signal.

Even when the operator inputs overriding commands in step 212, automatic control continues, just considering or accepting the operator inputs as temporal offsets during the subsequent harvesting and crop transferring operation. Once the next position in the loading strategy is to be aimed (i.e., at the time when step 206 is reached the next time), the amended relationship from step 218 is applied, such that operator override is not necessary anymore and the previous operator input is ignored.

Additional Aspect of Crop Transfer Control

Figure 6:
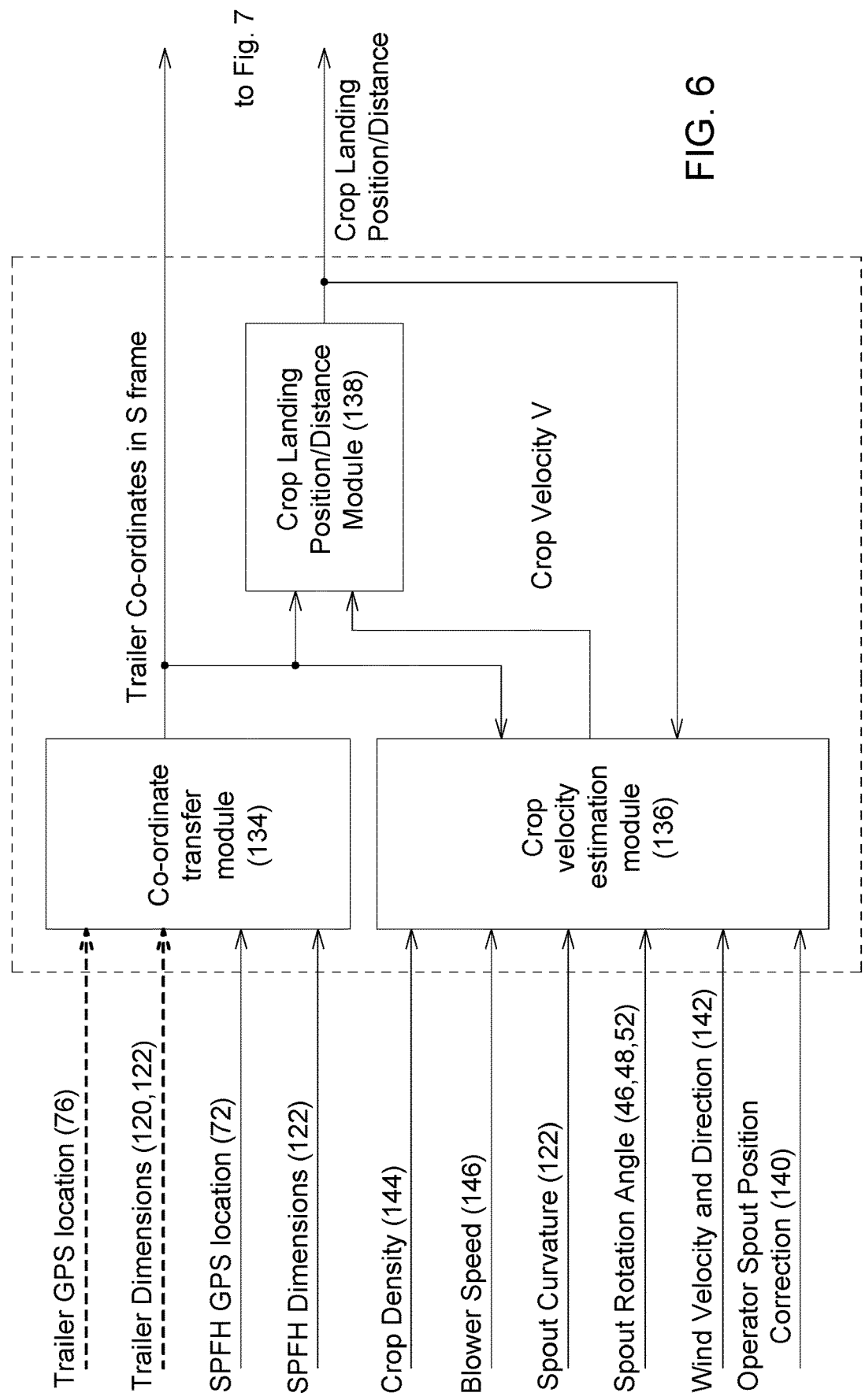
FIG. 6 shows a block diagram of a second embodiment of a control unit with parts for calculating the position where the crop impinges on the transport vehicle.
Figure 7:
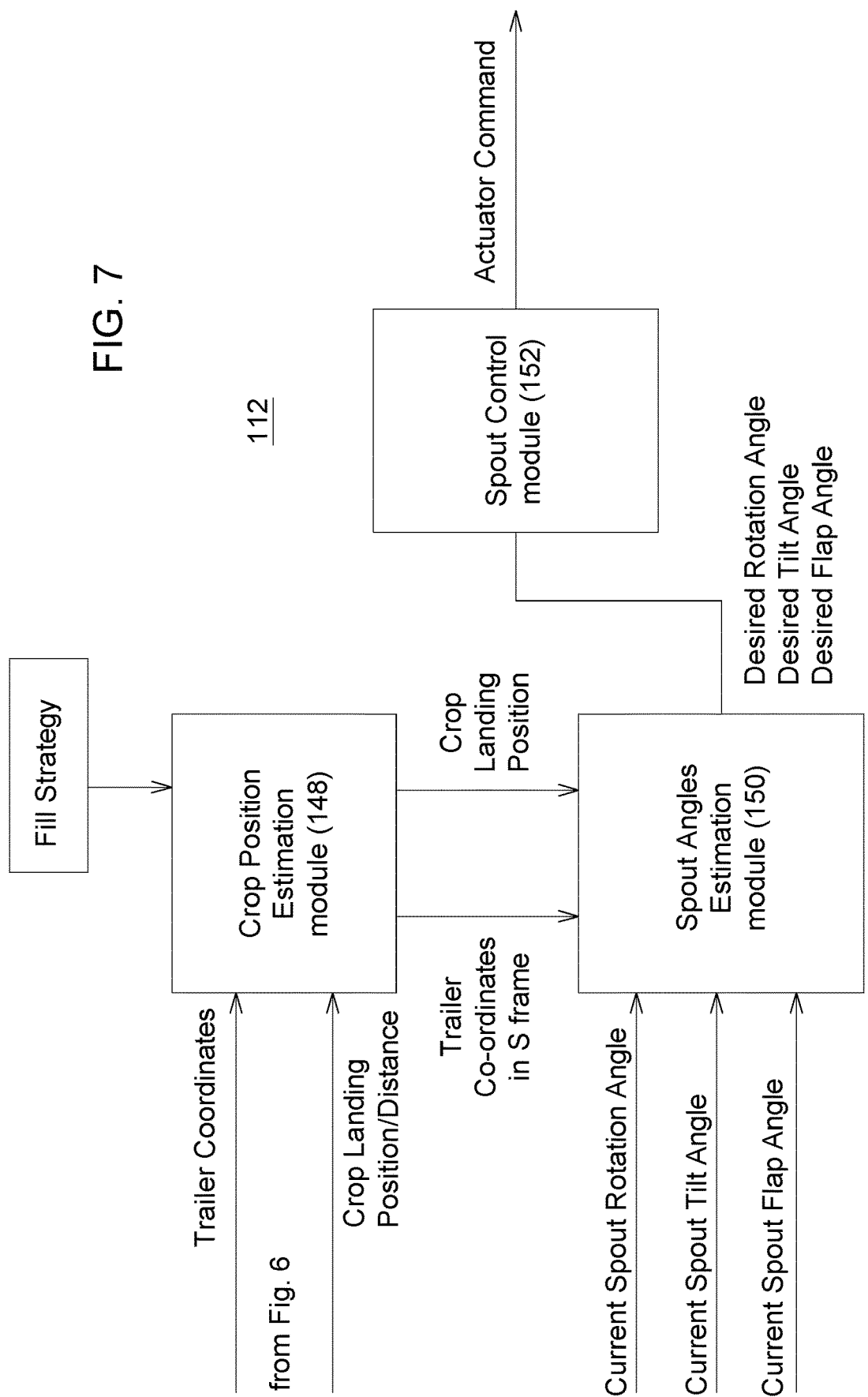
FIG. 7 shows a block diagram of the second embodiment of the control unit with parts for controlling actuators of a discharge device of the harvesting machine.
Figure 8:
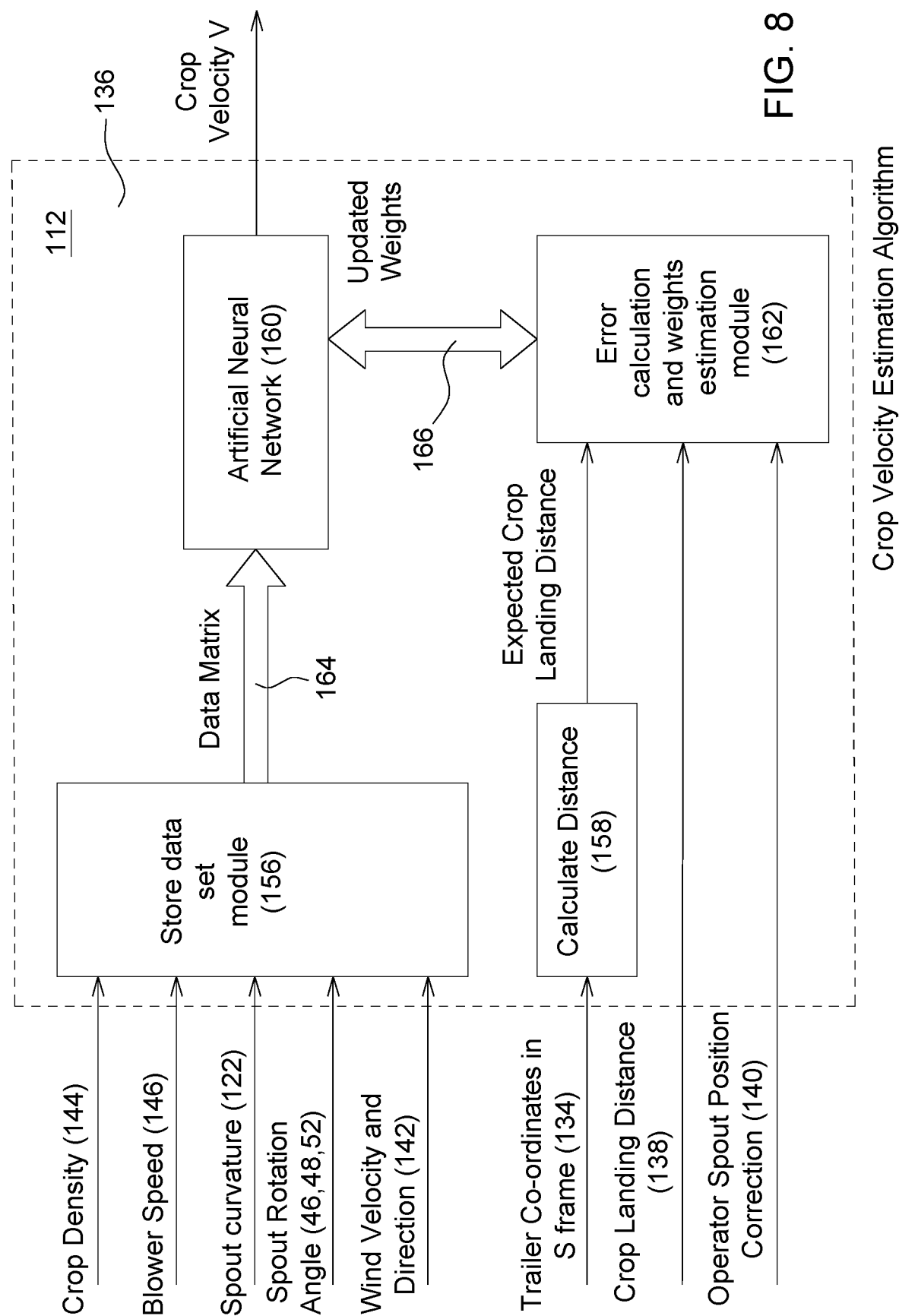
FIG. 8 shows a block diagram indicating the self-learning functionality of the control unit of FIGS. 6 and 7.

An additional aspect of a control unit 112 and its operation during crop unloading is shown in more detail in FIGS. 6-8. Specifically, FIG. 6 shows modules 134, 136, 138 of the control unit 112, which can be implemented in hardware or software. A coordinate transfer module 134 is configured to calculate the position and orientation (pitch, roll and yaw) of the container 18 in a coordinate system having its origin in the lower end of the discharging device 40, where it rotates around the vertical axis (due to action of actuator 46) and the horizontal axis (due to action of actuator 48), as indicated in FIGS. 2 and 4. The x-axis extends in the forward direction of the harvesting machine 10, the y-axis in the lateral direction and the z-axis in the vertical direction. The value x thus corresponds to the forward offset of a reference point of the container 18 with respect to the origin of the coordinate system, the value y to the lateral offset of the reference point of the container 18 with respect to the origin of the coordinate system and the value z to the vertical offset of the reference point of the container 18 with respect to the origin of the coordinate system. The coordinate transfer module 134 receives signals regarding the location and orientation (pitch, roll and yaw) of the container 18 or trailer 16 from the second position determination device 76, and uses known algorithms like a vehicle steering and/or bicycle model and dimensions of the trailer from memory 120 and/or 122 as described above, to convert the position and orientation of the second position determination device 76 to the position and orientation of the reference point on the container 18. The coordinate transfer module 134 also receives signals regarding the location and orientation of the origin of the coordinate system from the first position determination device 72, and uses known algorithms (e.g., U.S. Pat. No. 6,345,231) and dimensions of the harvesting machine 10 from memory 122, to convert the position and orientation of the first position determination device 72 to the position and orientation of the origin of the coordinate system.

The output of the coordinate transfer module 134 is, as discussed, the offset between the origin of the coordinate system and the reference point of the container 18 in three dimensions. This output is sent to the crop velocity estimation module 136, which has the purpose to calculate the actual velocity of the crop between the discharging device 40 and the impingement location 132. Further to the mentioned offset, the crop velocity estimation module 136 receives signals from the user interface 140 regarding operator input when overriding the automatic adjustment of actuators 46, 48, 52 (and optionally operator input overriding automatic speed and steering commands), from a wind sensor 142 sensing wind speed and wind direction, from a crop moisture or density sensor 144, which can be a near infrared sensor, and from a sensor 146 sensing the speed of the blower 38, and optionally from a crop mass flow rate sensor and/or a signal regarding the type of crop as input by the operator by a user interface or automatically recognized, and/or a signal regarding the cutting length of the crop and/or a signal regarding the topology of the field. The sensor 146 can sense the engine speed, which is normally directly coupled to the speed of the blower 38 due to a fixed transmission ratio of the drive train. Further, the crop velocity estimation module 136 is receiving signals regarding the actual position of the actuators 46, 48, 52, which can be provided by corresponding feedback sensors (not shown) used by control unit 112 for adjusting the actuators 46, 48, 52 as feedback signal or be just nominal values sent to the actuators 46, 48, 52 by control unit 112. The rationale for sending the discharging device angles is that the discharging device orientation affects the directional flow of the crop, and this has some effect on the crop velocity. Finally, the crop velocity estimation module 136 receives data from memory 122 regarding physical dimensions of the discharging device 40, like length and curvature and cross-sectional areas of the discharging device 40 at each end or at some predetermined locations on the discharging device 40.

As mentioned above, for control of the actuators 46, 48, 52 and/or the relative position of the vehicles, it is important to know the velocity of the crop after it has left the discharging device 40, since this velocity influences the impingement location 132. While this crop velocity could in theory be sensed with a suitable sensor, like a radar sensor in the discharging device 40, such a sensor would add cost and weight to the harvesting machine. The crop velocity estimation module 136 is thus using a crop flight model for the crop flow between the discharging device 40 and the impingement point 132 and optionally within the discharging device 40 to find out the actual crop velocity based on the various, mentioned inputs. Such a crop flight model is used in the material projection module described in U.S. Pat. No. 9,992,932, the contents of which incorporated herein by reference. By comparing impingement locations 132 calculated with the crop flight model for different crop velocities and assuming that the crop, due to the operator override inputs via the user interface 140, hits the desired impingement location, the crop velocity can be determined.

The crop velocity estimation module 136 outputs the (calculated) crop velocity to a crop landing position/distance module 138, which is configured to calculate the volume 154 around the harvesting machine 10 which can be reached with the crop, as indicated in FIGS. 9 and 10, using the mentioned crop flight model. Due to wind and air friction influences, the size and position of the volume 154 depends on the crop velocity. The output of the crop landing position/distance module 138, i.e., a signal regarding the volume 154, is also fed back to the crop velocity estimation module 136.

As shown in FIG. 7, a crop position estimation module 148 of control unit 112 receives the above-mentioned trailer coordinates from the coordinate transfer module 134 and the data regarding the volume 154 from crop landing position/distance module 138 and uses both to calculate a desired crop landing position, which also is controlled by the mentioned loading strategy. This desired crop landing position is fed to a spout angles estimation module 154, receiving also signals on the actual angles or positions of the actuators 46, 48, 52 and outputs desired angles or positions of the actuators to a spout control module 152 controlling the actuators 46, 48, 52.

One use of the crop landing position/distance module 138 is to inform the operator of the harvesting machine 10 by an interface if the container 18 is not reachable by the crop, such that the harvesting process can in this case be suspended. The signal of the crop landing position/distance module 138 can also be used to inform the operator of the harvesting machine 10 whether a second container (not shown, but see German Patent Appl. No. DE 10 2012 211 001 A1, the contents of which incorporated herein by reference) can be loaded once the actually loaded container 18 is full (and the discharging device 40 automatically be moved to fill the second container since in the reach of the harvesting machine, or the harvesting process needs to be suspended.

As mentioned, the modules shown in FIGS. 6 and 7 can additionally to the described control of the actuators 46, 48, 52 or alternatively thereto control the relative positioning of the harvesting machine 10 and the container 18, as per se known in the art.

FIG. 8 shows the crop velocity estimation module 136 of FIG. 6 in more detail. A store data set module 156 receives the signals regarding crop density or moisture from sensor 144, blower speed from sensor 146, on curvature and dimensions of the discharging device 40 from memory 122, wind velocity and direction from sensor 142 (or wirelessly from a remote (weather) station), and position of the actuators 46, 48, 52, as discussed above with respect to FIG. 6, and optionally from a crop mass flow rate sensor and/or a signal regarding the type of crop as input by the operator using an interface or automatically recognized, and/or a signal regarding the cutting length of the crop and/or a signal regarding the topology of the field. All these data are input by a store data set module 156 into a data matrix 164, which is input to a neural network 160. The neural network 160 is trained with a data set generated from various different input parameters (continuous and/or categorical) and stored in memory 122.

A calculate distance module 158 on the other hand receives the signals on the coordinates of container 18 in the mentioned coordinate reference system having its origin on the bottom of the discharging device 40, provided by the coordinate transfer module 134 and calculates the distance the crop has to pass to reach the impingement region 132. This distance, as well as the crop landing position/distance (=volume 154) calculated by the crop landing/position module 138 and the overriding signals given by operator via interface 140 are provided as inputs to an error calculation and weights estimation module 162, which provides updated weights 166 to the neural network 160, which outputs the crop velocity. Thus, for every input vector of the data set, an error is calculated from the expected (based on an actually stored crop velocity) and measured (i.e., based on operator input via interface 140) crop landing distance. This error is continuously minimized by updating the numerical weights, used in the neural network 160, using back propagation e.g., a gradient descent algorithm. Besides the error minimization, another trigger to update the weights is when the operator manually changes the actuator positions (via interface 140) from the angles prescribed by the control algorithm.

Thus, the operator inputs via interface 140 are used as inputs to correct the crop velocity considered by the algorithm for determining the impingement location 132 and the actuator control signals in a self-learning manner. The error calculation and weights estimation module 162 considers on one hand the landing position of the crop as provided by the crop landing position/distance module 138 and on the other hand the distance calculated by the calculate distance module 158, which is based on the calculated distance basing on the sensed positions. Possible differences are compared with the operator inputs and thus possible errors of the crop flight model, in particular due to errors of the wind sensor 142, can be considered by the neural network 160 and thus corrected.

It should be noted that the signals from the position determining devices 72, 76 can be augmented or replaced by a camera 168, for example mounted on the discharging device 40 and looking to the container 18, with an image processing system detecting the relative position of the container 18 with respect to the origin of the mentioned coordinate system or any other suitable reference point.

Finally, the previous description concentrates on the influence of the wind as it is sensed by sensor 142 to the impingement location 132, and the crop velocity affecting this influence. However, there are a number of sensors (for example the sensors 142, 144, 146, 168, sensors for the positions of the actuators 46, 48, 52, and the position determining devices 72, 76) and other data, like dimensions of the discharging device 40, dimensions of the harvesting machine 10 and dimensions of the transport vehicle 12 and estimations or models, like the one used for calculation of the location of a reference point on the container 18 based on the position and orientation of the position determining device 76 that are needed by control unit 112 to provide the control signal to the actuators 46, 48, 52, and all of them are potentially incorrect or inexact or contain an error. The general idea of the present disclosure, to use the operator as an additional sensor for correcting possible errors of any one or more of the mentioned sensor signals and other data, can be applied in a corresponding manner.

The operator thus inputs his or her override inputs to the control signals via interface 140 in case that he or she considers the actual impingement location 132 not as optimal. From these inputs, the control unit 112 learns that the relation between the sensor signal and other data on one hand and the control signal on the other hand is not optimal and thus corrects, at least after some time required for learning, the relation between the sensor signal and other data on one hand and the control signal on the other hand. This can be done with the neural network 160 (which represents among others the crop flight model) updated by the error calculation and weights estimation module 162 as discussed above, having the same or a different output than the crop velocity, but other values as input signal of the error calculation and weights estimation module 162. However, also any other self-learning algorithms can be applied, as known per se in the art.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the signal bearing medium used to carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a control unit, computer system or computing element (or portion thereof) such as, but not limited to, one or more or some combination of: a visual organizer system, a request generator, an Internet coupled computing device, a computer server, etc. In one example, the control unit, computer system and/or the computing element may manipulate and transform information and/or data represented as physical (electronic) quantities within the control unit, computer system's and/or computing element's processor(s), register(s), and/or memory(ies) into other data similarly represented as physical quantities within the control unit, computer system's and/or computing element's memory(ies), register(s) and/or other such information storage, processing, transmission, and/or display components of the computer system(s), computing element(s) and/or other electronic computing device(s). Under the direction of computer-readable instructions, the control unit, computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

It should also be noted that the different examples described herein can be combined in different ways. That is, parts of one or more examples can be combined with parts of one or more other examples. All of this is contemplated herein.

Example 1 is an apparatus for controlling the transfer of agricultural crop from a harvesting machine to a transport vehicle, the apparatus comprising:

an electronic control unit, the electronic control unit configured to provide a control signal to an actuator adapted to control at least one of a relative position of a distal end of the discharging device or a discharge direction of a crop discharging device on the harvesting machine with respect to a crop loading container of the transport vehicle and wherein the electronic control unit is adapted to provide the control signal based on a sensor signal from at least one sensor and stored data regarding a relationship between the sensor signal and the control signal, the at least one sensor configured to sense one or more physical values influencing an impingement location of the crop on the container; and an operator interface connected to the electronic control unit, the operator interface configured to provide an operator override input signal regarding a received operator input for overriding the control signal, such that the operator can modify the control signal if the impingement location observed by the operator deviates from a desired impingement location, characterized in that the control unit is configured to modify the stored data regarding the relationship between the sensor signal and the control signal based upon the operator override input signal.

Example 2 is the apparatus for controlling the transfer of agricultural crop from a harvesting machine to a transport vehicle of any or all previous examples and further comprising at least one sensor is configured to sense a physical property of at least one of the crop, wind and a relative position of the container with respect to the harvesting machine.

Example 3 is the apparatus for controlling the transfer of agricultural crop from a harvesting machine to a transport vehicle of any or all previous examples and further comprising the at least one sensor is a position determining device, the position determining device configured to determine the position of at least one of the harvesting machine and the transport vehicle.

Example 4 is the apparatus for controlling the transfer of agricultural crop from a harvesting machine to a transport vehicle of any or all previous examples and further comprising the position determining device is configured to determine the orientation of at least one of the harvesting machine and the transport vehicle.

Example 5 is the apparatus for controlling the transfer of agricultural crop from a harvesting machine to a transport vehicle of any or all previous examples and further comprising the control signal comprises parameters of a crop flight model of a crop trajectory from the distal end of the discharging device to the impingement location on the container.

Example 6 is the apparatus for controlling the transfer of agricultural crop from a harvesting machine to a transport vehicle of any or all previous examples and further comprising the electronic control unit is configured to calculate an expected impingement location of the crop on the container based upon a calculated relative position of a reference point on the harvesting machine with respect to the container, a known geometry of the discharging device and the crop flight model for determining the trajectory of the crop from the distal end of the discharging device to the impingement location, and to calculate a control signal to the actuator in the sense of minimizing the difference between the calculated impingement location and a desired impingement location, which is based on a container filling strategy.

Example 7 is the apparatus for controlling the transfer of agricultural crop from a harvesting machine to a transport vehicle of any or all previous examples and further comprising the actuator is configured to control the angle of the discharge device around at least one of a vertical axis and a horizontal axis.

Example 8 is the apparatus for controlling the transfer of agricultural crop from a harvesting machine to a transport vehicle of any or all previous examples and further comprising the actuator is configured to control the angle of the discharge device using at least one of an angle of a flap controlling the discharge angle of the crop, speed of the harvesting machine and steering direction of the harvesting machine and transport vehicle.

Example 9 is a method for controlling the transfer of agricultural crop from a harvesting machine to a transport vehicle, the method comprising:

generating, with an electronic control unit, a control signal to an actuator for controlling a relative position of a distal end of the discharging device with respect to a container on the transport vehicle;

comparing, with the electronic control unit, a sensor signal from at least one sensor relating to one or more physical values influencing a calculated impingement location of the crop on the container and stored data regarding a relationship between the sensor signal and the control signal;

inputting, with an operator interface, an operator override input signal regarding a received operator input for overriding the control signal, such that the operator can modify the control signal in case that an impingement location observed by the operator deviates from the calculated impingement location; and modifying, with the electronic control unit, the stored data regarding the relationship between the sensor signal and the control signal based upon the operator override input signal.

Example 10 is the method for controlling the transfer of agricultural crop from a harvesting machine to a transport vehicle of any or all previous examples and further comprising at least one sensor is configured to sense a physical property of at least one of the crop, wind and a relative position of the container with respect to the harvesting machine.

Example 11 is the method for controlling the transfer of agricultural crop from a harvesting machine to a transport vehicle of any or all previous examples and further comprising the at least one sensor is a position determining device, the position determining device configured to determine the position of at least one of the harvesting machine and the transport vehicle.

Example 12 is the method for controlling the transfer of agricultural crop from a harvesting machine to a transport vehicle of any or all previous examples and further comprising the position determining device is configured to determine the orientation of the harvesting machine and the transport vehicle.

Example 13 is the method for controlling the transfer of agricultural crop from a harvesting machine to a transport vehicle of any or all previous examples and further comprising the stored data regarding the relationship between the sensor signal and the control signal comprises parameters of a crop flight model of a crop trajectory from the distal end of the discharging device to the impingement location on the container.

Example 14 is the method for controlling the transfer of agricultural crop from a harvesting machine to a transport vehicle of any or all previous examples and further comprising the electronic control unit is configured to calculate an expected impingement location of the crop on the container based upon a calculated relative position of a reference point on the harvesting machine with respect to the container, a known geometry of the discharging device and the crop flight model for determining the trajectory of the crop from the distal end of the discharging device to the impingement location, and to calculate a control signal to the actuator in the sense of minimizing the difference between the calculated impingement location and a desired impingement location, which is based on a container filling strategy.

Example 15 is the method for controlling the transfer of agricultural crop from a harvesting machine to a transport vehicle of any or all previous examples and further comprising the actuator is configured to control the angle of the discharge device around at least one of a vertical axis and a horizontal axis.

Example 16 is the method for controlling the transfer of agricultural crop from a harvesting machine to a transport vehicle of any or all previous examples and further comprising the actuator is configured to control the angle of the discharge device using at least one of an angle of a flap controlling the discharge angle of the crop, speed of the harvesting machine and steering direction of the harvesting machine and transport vehicle.

The invention claimed is:

1. An apparatus for controlling the transfer of agricultural crop from a harvesting machine to a transport vehicle, the apparatus comprising:
   an electronic control unit, the electronic control unit configured to provide a control signal to an actuator adapted to control at least one of a relative position of a distal end of a crop discharging device or a discharge direction of the crop discharging device on the harvesting machine with respect to a crop loading container of the transport vehicle and wherein the electronic control unit is adapted to provide the control signal based on a sensor signal from at least one sensor and stored data regarding a relationship between the sensor signal and the control signal, the at least one sensor configured to sense one or more physical values influencing an impingement location of the crop on the container; and
   an operator interface connected to the electronic control unit, the operator interface configured to provide an operator override input signal regarding a received operator input for overriding the control signal, such that the operator can modify the control signal if the impingement location observed by the operator deviates from a desired impingement location, characterized in that the control unit is configured to modify the stored data regarding the relationship between the sensor signal and the control signal based upon the operator override input signal.

2. The apparatus of claim 1 wherein the at least one sensor is configured to sense a physical property of at least one of the crop, wind and a relative position of the container with respect to the harvesting machine.

3. The apparatus of claim 2 wherein the at least one sensor is a position determining device, the position determining device configured to determine the position of at least one of the harvesting machine and the transport vehicle.

4. The apparatus of claim 3, wherein the position determining device is configured to determine the orientation of at least one of the harvesting machine and the transport vehicle.

5. The apparatus of claim 1 wherein the stored data regarding the relationship between the sensor signal and the control signal comprises parameters of a crop flight model of a crop trajectory from the distal end of the crop discharging device to the impingement location on the container.

6. The apparatus of claim 5 wherein the electronic control unit is configured to calculate an expected impingement location of the crop on the container based upon a calculated relative position of a reference point on the harvesting machine with respect to the container, a known geometry of the crop discharging device and the crop flight model for determining the trajectory of the crop from the distal end of the crop discharging device to the impingement location, and to calculate a control signal to the actuator in the sense of minimizing the difference between the calculated impingement location and a desired impingement location, which is based on a container filling strategy.

7. The apparatus of claim 6 wherein the actuator is configured to control an angle of the crop discharging device around at least one of a vertical axis and a horizontal axis.

8. The apparatus of claim 6 wherein the actuator is configured to control an angle of the discharge device using at least one of an angle of a flap controlling the discharge angle of the crop, speed of the harvesting machine and steering direction of the harvesting machine and transport vehicle.

9. A method for controlling the transfer of crop from a harvesting machine to a transport vehicle, the method comprising:
   generating, with an electronic control unit, a control signal to an actuator for controlling a relative position of a distal end of a crop discharging device with respect to a container on the transport vehicle;
   comparing, with the electronic control unit, a sensor signal from at least one sensor relating to one or more physical values influencing a calculated impingement location of the crop on the container and stored data regarding a relationship between the sensor signal and the control signal;
   inputting, with an operator interface, an operator override input signal regarding a received operator input for overriding the control signal, such that the operator can modify the control signal in case that an impingement location observed by the operator deviates from the calculated impingement location; and
   modifying, with the electronic control unit, the stored data regarding the relationship between the sensor signal and the control signal based upon the operator override input signal.

10. The method of claim 9 wherein the at least one sensor is configured to sense a physical property of at least one of the crop, wind and a relative position of the container with respect to the harvesting machine.

11. The method of claim 10 wherein the at least one sensor is a position determining device, the position determining device configured to determine the position of at least one of the harvesting machine and the transport vehicle.

12. The method of claim 11 wherein the position determining device is configured to determine the orientation of the harvesting machine and the transport vehicle.

13. The method of claim 9 wherein the stored data regarding the relationship between the sensor signal and the control signal comprises parameters of a crop flight model of a crop trajectory from the distal end of the crop discharging device to the impingement location on the container.

14. The method of claim 13 wherein the electronic control unit is configured to calculate an expected impingement location of the crop on the container based upon a calculated relative position of a reference point on the harvesting machine with respect to the container, a known geometry of the crop discharging device and the crop flight model for determining the trajectory of the crop from the distal end of the crop discharging device to the impingement location, and to calculate a control signal to the actuator in the sense of minimizing the difference between the calculated impingement location and a desired impingement location, which is based on a container filling strategy.

15. The method of claim 14 wherein the actuator is configured to control an angle of the crop discharging device around at least one of a vertical axis and a horizontal axis.

16. The method of claim 14 wherein the actuator is configured to control an angle of the crop discharging device using at least one of an angle of a flap controlling the discharge angle of the crop, speed of the harvesting machine and steering direction of the harvesting machine and transport vehicle.

17. The apparatus of claim 16 wherein the actuator is configured to automatically provide the control signal to control the at least one of the relative position of a distal end of a crop discharging device or the discharge direction of the crop discharging device by automatically providing the control signal to control at least one of an angle of the crop discharging device around at least one of a vertical axis and a horizontal axis, an angle of a flap of the crop discharging device, a speed of the harvesting machine, steering direction of the harvesting machine, and steering direction of the transport vehicle.

18. An apparatus for controlling the transfer of crop from a harvesting machine to a transport vehicle, the apparatus comprising:

an electronic control unit, the electronic control unit configured to automatically provide a control signal to control at least one of a relative position of a distal end of a crop discharging device or a discharge direction of the crop discharging device on the harvesting machine with respect to a crop loading container of the transport vehicle and wherein the electronic control unit is adapted to automatically provide the control signal based on a sensor signal from at least one sensor and stored data regarding a relationship between the sensor signal and the control signal, the at least one sensor configured to sense one or more physical values influencing an impingement location of the crop on the container; and an operator interface connected to the electronic control unit, the operator interface configured to provide an operator override input signal regarding a received operator input for overriding the control signal, such that the operator can modify the control signal if the impingement location observed by the operator deviates from a desired impingement location, characterized in that the control unit is configured to modify the stored data regarding the relationship between the sensor signal and the control signal based upon the operator override input signal.

19. The apparatus of claim 18 wherein the at least one sensor is configured to sense a physical property of at least one of the crop, wind and a relative position of the container with respect to the harvesting machine.

20. The apparatus of claim 18 wherein the stored data regarding the relationship between the sensor signal and the control signal comprises parameters of a crop flight model of a crop trajectory from the distal end of the crop discharging device to the impingement location on the container, and wherein the electronic control unit is configured to calculate an expected impingement location of the crop on the container based upon a calculated relative position of a reference point on the harvesting machine with respect to the container, a known geometry of the crop discharging device and the crop flight model for determining the trajectory of the crop from the distal end of the crop discharging device to the impingement location, and to calculate a control signal to the actuator in the sense of minimizing the difference between the calculated impingement location and a desired impingement location, which is based on a container filling strategy.

* * * * *